United States Patent
Kaldor et al.

(10) Patent No.: US 6,350,983 B1
(45) Date of Patent: Feb. 26, 2002

(54) MICRO-ELECTRO-OPTO-MECHANICAL INERTIAL SENSOR

(75) Inventors: Shmuel Kaldor; Yael Nemirovsky, both of Haifa; Ehud Netzer, Timrat; Dan Seter, Haifa; Ofir Degani, Ashkelon; Eran Socher, Tel-Aviv, all of (IL)

(73) Assignees: Rafael-Armament Development Authority Ltd.; Technion Research and Development Foundation Ltd., both of Haifa (IL)

(*) Notice: Subject to any disclaimer, the term of this patent is extended or adjusted under 35 U.S.C. 154(b) by 0 days.

(21) Appl. No.: 09/381,082
(22) PCT Filed: Jan. 13, 1999
(86) PCT No.: PCT/IL99/00021
§ 371 Date: Jul. 21, 2000
§ 102(e) Date: Jul. 21, 2000
(87) PCT Pub. No.: WO99/36788
PCT Pub. Date: Jul. 22, 1999

(30) Foreign Application Priority Data

Jan. 15, 1998 (IL) .................................................. 122947

(51) Int. Cl.⁷ .............................................. G01P 15/02
(52) U.S. Cl. .................. 250/231.1; 257/431; 73/514.26
(58) Field of Search ............................. 250/231.1, 229, 250/222.1, 221, 214 R, 214.1, 216; 257/414, 415, 435, 431; 73/514.01, 514.02, 514.14, 514.15, 514.16, 514.18, 514.19, 514.21, 514.24, 514.26, 514.29, 514.38, 651, 652, 653

(56) References Cited

U.S. PATENT DOCUMENTS

| | | | | |
|---|---|---|---|---|
| 5,241,861 A | * | 9/1993 | Hulsing, II | 73/514.02 |
| 5,659,195 A | * | 8/1997 | Kaiser et al. | 257/415 |
| 6,092,422 A | * | 7/2000 | Rinnig et al. | 73/651 |

* cited by examiner

*Primary Examiner*—John R. Lee
(74) *Attorney, Agent, or Firm*—Cowan Leibowitz & Latman; William H. Dippert

(57) ABSTRACT

A micro-electromechanical optical inertial sensing device comprises a CMOS chip (3), comprising at least one integrated photodiode (6) and analog electronics; an elastically suspended proof mass (1); and a light source (4). A light beam from the light source casts a partial shadow of the proof mass over the photodiode when the proof mass is at rest. When subjected to an inertial movement, the proof mass swings causing the partial shadow to shift and modulate the illumination of the photodiode. An output current signal from the photodiode is processed by the analog electronics to generate measurement results.

20 Claims, 2 Drawing Sheets

MICRO-ELECTRO-OPTO-MECHANICAL INERTIAL SENSOR

FIELD OF INVENTION

The present invention relates to micromechanics and microsensors. More particularly it relates to a micro electromechanical optical inertial sensing device.

BACKGROUND OF THE INVENTION

Micromechanics is a scientific and technological field dealing with the research and development of microsystems and microelements that incorporate sensing, controlling, and actuating, using microelectronics technology. The common basic material for such devices is silicon, and the dimensions of devices incorporating VLSI approach microelectronics are usually in the range of 10 $\mu$m to 1000 $\mu$m. These devices incorporate control and logic elements, and are designed to operate under various performance regimes, these being mechanical, electrical, optical, biological, thermal, fluidal, chemical or nuclear. Micromechanical devices are meant to be small, cheap to produce and ideal for mass production. These properties render micromechanical devices advantages in terms of performance, reliability and cost saving of the grater system mostly, where the micro device dictates its overall minimum size.

Production technologies of micromechanical devices involve several known methods of micro-processing: photolithography, wet etching, dry etching, evaporation, sputtering, deposition, oxidation, etc. Commonly used production technologies are: surface micromachining—microprocessing of thin film layers, as opposed to bulk micromachining—microprocessing of bulk materials; hybrid micromachining—the mechanical device is attached to a microelectronic chip, as opposed to monolithic micromachining—the mechanical devices and the electronics are incorporated on the same chip; LIGA—the third dimension is shaped using X-ray lithography and constrained electroplating.

Inertial sensing devices are used in various applications like avionics, missile guidance systems, vehicle safety systems (airbags), spacecraft guidance and navigation systems, etc. In many of these applications, overall size and cost depend critically on the size of the navigation system. Effort is thus being put into the prospects of providing micromechanical inertial sensing devices, in order to furnish cheap, mass produced, accurate, very small such devices.

Micromachined devices that are based on the dynamic response of their particular structure include accelerometers, pace meters, pressure sensors, moisture gauges, and others. In such devices the typical dynamic parameters—such as the resonance frequency, Q factor, amplification, and damping—present means for measuring the independent variable, it being acceleration, partial pressure and others. Although the basic motion laws apply in three-dimensional structures, in the micron and submicron scales, non-linear effects, which are often negligible in the macro-environment, become dominant. Among others, these non-linear effects include damping mechanisms unique for the specific micromechanical geometries, and external loads, which occur, for example, as a result of an electrostatic excitation and the parasitic effect of capacitive sensing.

Micromechanical proof-mass devices can be designed to move in any of the six degrees of freedom. These movements result both from internal excitation and/or external physical loads. Common methods of excitations are electrostatic—vertical, horizontal (as in comb-drive) or tilt; piezoelectric; optical; and others. The movements caused by the physical measure, which can be pressure, angular rate, acceleration, must be sensed by the device in order to estimate it.

There are several common sensing methods used in micromachined devices. One method is the capacitive sensing, where the movement of the microstructure changes the relative position of one capacitor plate relatively to the other, thus changing the capacitance and measuring these changes. A slightly different sensing approach is implemented using a comb-like structure—a structure of comb-like fins joined by a firm base, which are incorporated with an opposite comb-like structure attached to a static frame. The movement of the microstructure changes the overlapping area of the corresponding fins, resulting in a change in the total capacitance.

Another method is the piezoelectric sensing, where a change in the electric field inside crystallic matter is induced by a mechanical strain, and is recorded. Yet another sensing method is the piezoresistive sensing, where the change in the resistance of the piezoresistive layer is recorded, known to be dependent on the mechanical strain.

An optical sensing method can be used in conjunction with a membrane. A laser light beam is directed at the membrane and its change in deflection, or its reflected intensity is measured, depending on the nature of the surface curvature imposed by the dynamic motion of the membrane.

There are two main factors that limit the MDS (Minimum Detectable Signal). One factor that exists in all sensing systems is noise. There are several noise mechanisms in micromechanical devices such as: mechanical noise, electronics noise, light noise, etc. The noise sources can be either 'white' (frequency independent) or '1/f' ("f" for frequency). Another factor that exists in some of the sensing methods is cross-talk between the sensing mechanism and the dynamics of the microstructure, e.g. in capacitive sensing.

It is the object of the present invention to provide a micromachined optical sensing device for the detection of rate and acceleration, using optical means that are independent of the dynamics of the micromechanical device, thus simplifying the analysis and improving sensitivity.

BRIEF DESCRIPTION OF THE INVENTION

The micro electromechanical optical inertial sensing device of the present invention comprises
- a CMOS chip comprising at least one integrated photodiode and analog electronics;
- an elastically suspended proof mass, hybridically attached to a CMOS chip, over the chip,
- a specified light source, directing a light beam at the suspended proof mass, on the side facing away from the CMOS chip, thus casting a partial shadow over said photodiode, when the suspended proof mass is at rest;
- a signal processing circuit for the on chip processing of the photodiode output signal; and
- mechanical and electrical connecting means, to join the proof mass component with the CMOS chip component;

wherein said photodiode is positioned substantially along the imaginary coaxis of the assumed measured movement and said proof mass, said photodiode being electrically connected to the processing means, wherein when the device is subjected to an inertial movement, the suspended proof mass swings, thus causing the partial shadow casted on the photodiode to shift, and modulate the light beam illumination on the CMOS integrated photodiode, generating subsequent output current signal transmitted to and processed by analog electronics processing means, to produce meaningful measurement results, or to generate electronic signals to other systems.

DETAILED DESCRIPTION OF THE INVENTION AND FIGURES

Figure 1:
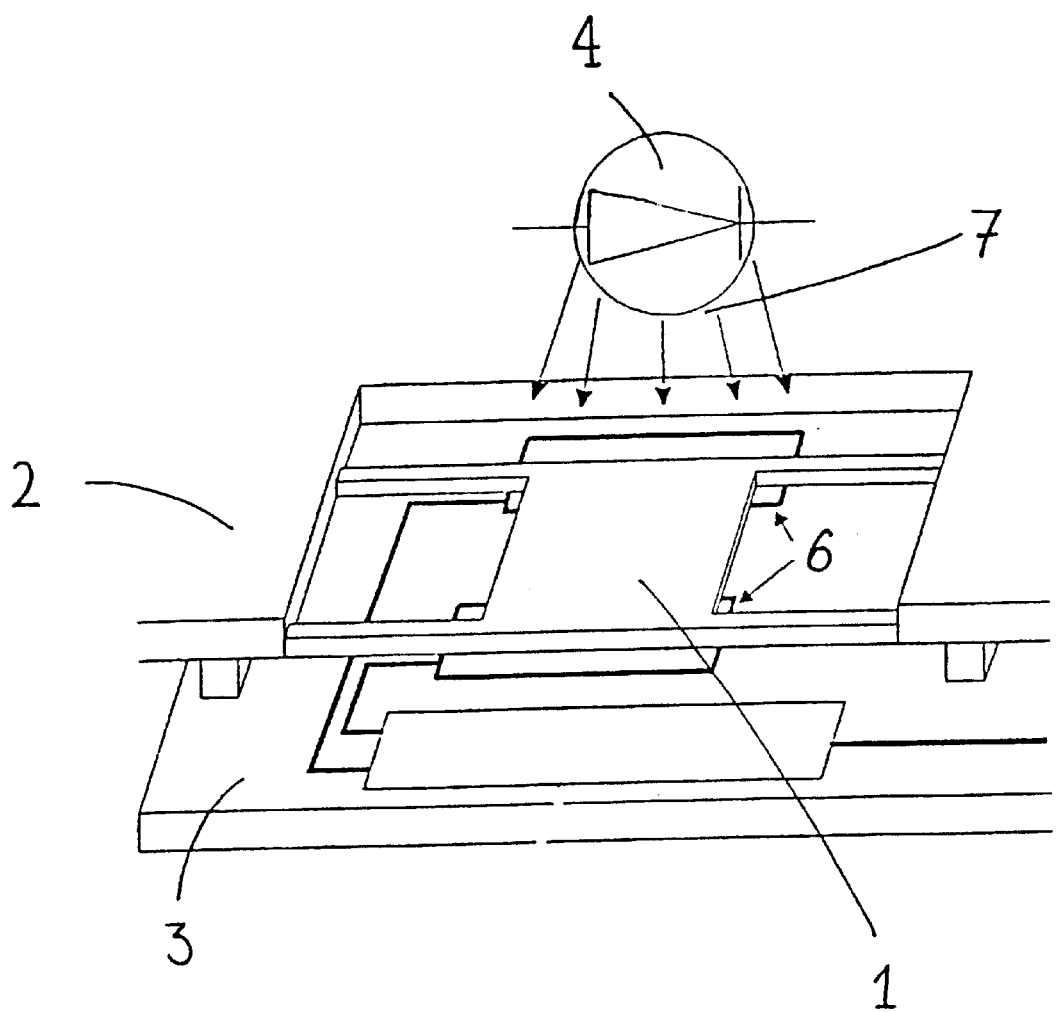
FIG. 1 illustrates a typical micro electromechanical optical inertial sensing device inaccordance with the present invention, used as an inertial sensor.

The micro electromechanical optical inertial sensing device in accordance with the present invention, being used an as inertial sensor, is hereby explained, with reference to FIG. 1.

A suspended proof mass (1), preferably fabricated by bulk micromachining of a silicon wafer of a predetermined thickness, is suspended by resilient beams to a solid frame (2). The frame (2) is hybridically attached to a CMOS chip (3), so that the proof mass (1) is suspended over the CMOS chip (3). Mechanical spacer elements can be used to build the functional gap for the proof mass motion over the CMOS chip.

A specific light source (4) projects a light beam (7) directed at the suspended proof mass (1), on the side facing away from the CMOS chip (3), thus casting a partial shadow over two photodiodes (6) on the chip. When the device is subjected to an inertial movement, the suspended proof mass swings, thus causing the partial shadow casted on the photodiodes by the suspended proof mass blocking the light beam (7) to shift, and modulate the light beam illumination on the CMOS integrated photodiodes (6) which are positioned substantially at the circumference of the partial shadow of the suspended proof mass (1) casted on the CMOS chip, when the device is at rest, and opposite each other. A subsequent differential output current signal generated by the photodiodes is then transmitted to, amplified and processed by analog electronics processing means using a known algorithm, to produce meaningful measurement results, or to generate electronic signals to other systems. The photodiodes are substantially along the imaginary axis of the assumed measured movement and said proof mass. The device can measure inertial movements parallel or/and perpendicular to the CMOS chip plane.

It should be noted that one photodiode would suffice, but using at least two photodiodes, in the arrangement suggested in FIG. 1 is preferable as it results in differential output current generated by the photodiodes, which enhances the device sensitivity.

The device of the present invention can be used as a rate gyroscope, when an adjustment is made, as is hereafter explained. There is a growing interest in micromechanical rate gyroscopes, based on their small dimensions, their potential to be simultaneously fabricated like IC chips, and their relative low cost of production. Most rate gyroscopes are categorized into two main groups: vibrating and rotating gyroscopes. Due to their nature micro-electro-mechanical rate gyroscopes are mostly vibrating and can be classified according to the nature of the actuation means used for the excited vibration, and the output sensing techniques. Commonly used actuation (either lateral or vertical) techniques are electrostatic actuation, piezoelectric actuation and electromagnetic actuation. The output response to rate is sensed either capacitively or piezoelectrically. In the vibrating rate gyroscope according to the present invention, the output response rate is sensed optically.

Figure 2:
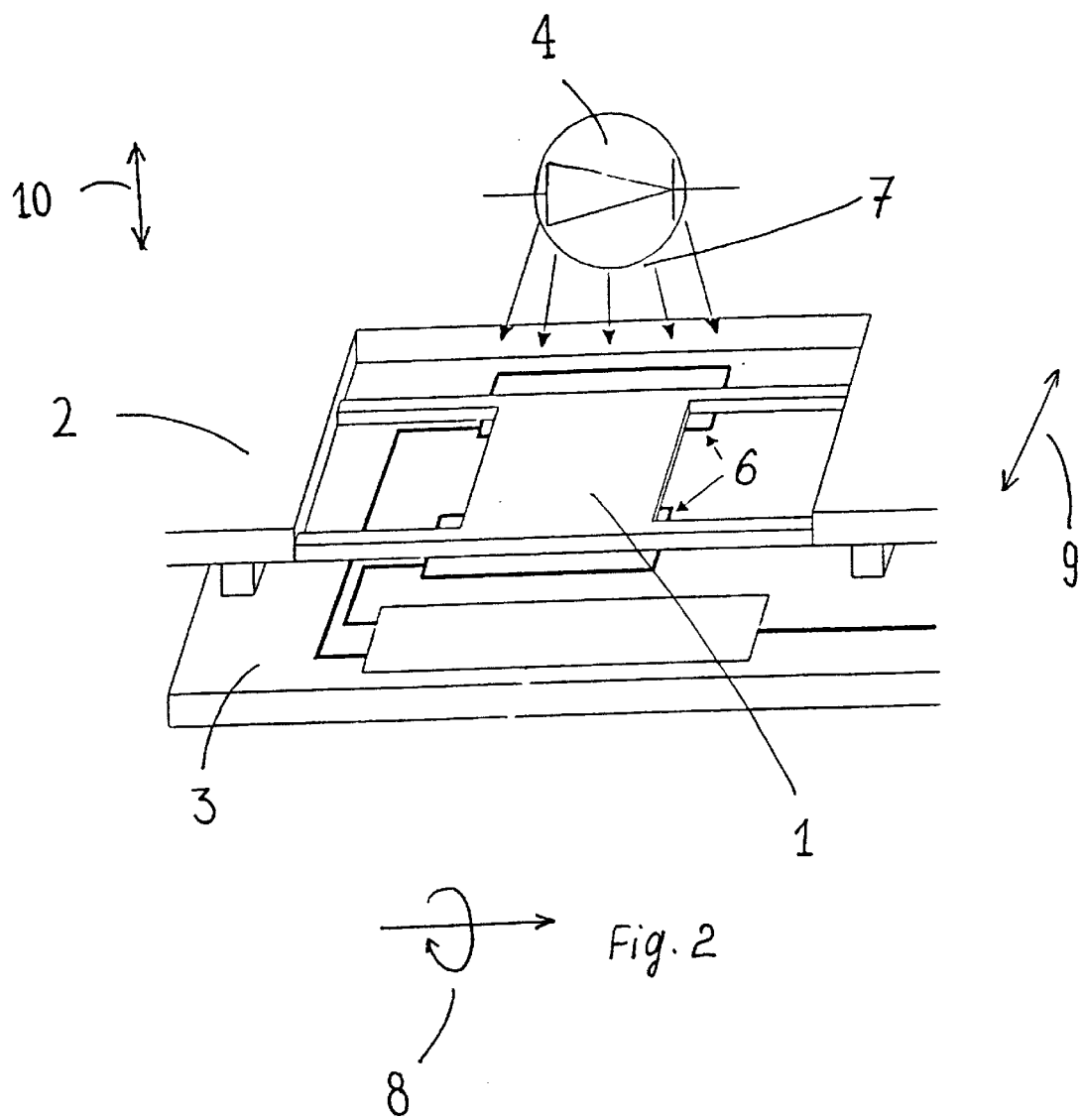
FIG. 2 illustrates a typical micro electromechanical optical inertial sensing device in accordance with the present invention, used as a vibrating rate gyroscope.

Reference is now made to FIG. 2, illustrating a typical micromachined optical differential sensing device in accordance with the present invention, used as a vibrating rate gyroscope.

The vibrating rate gyroscope of the present invention is arranged similarly to the micromachined inertial differential optical sensing device, consisting of a suspended proof mass (1), suspended by resilient beams to a solid frame (2), hybridically attached to a CMOS chip(3), over the chip. A specific light source (4) projects a light beam (7) directed at the suspended proof mass (1), on the side facing away from the CMOS chip (3), thus casting a partial shadow over the chip. CMOS integrated photodiodes (6) are positioned substantially at the circumference of the partial shadow of the suspended proof mass (1) casted on the CMOS chip, when the device is at rest. The significant difference between the vibrating rate gyroscope and the micromachined inertial differential optical sensing device, is that the suspended proof mass (1) is subjected to excited vibration perpendicularly to the CMOS chip plane, as shown by the arrow assigned the numeral (10). The excitation is achieved by applying an alternating voltage to electrodes on the proof mass and on the CMOS chip, each electrode being positioned opposite the other to form capacitor plates. The electrodes are preferably evaporated metal plates, and act as an air capacitor. The alternated voltage induces an excited vibration of the suspended proof mass perpendicular to the CMOS chip plane. It should be noted that other means of excitation (magnetic, thermal or piezoelectric excitation) can also be used. When the device rotates about an axis parallel to the chip plane, in the direction shown by the arrow assigned the numeral (8), and perpendicular to the excited vibration axis (10), subsequent Coriolis forces exert a force perpendicular to both axis of rotation (8) and axis of the excited vibration (10), in the direction indicated by the arrow assigned the numeral (9), thus inducing a displacement of the suspended proof mass, and subsequent shift of the partial shadow it casts over the photodiodes. Vibrations in the output mode (the measured mode) of the suspended proof mode modulate the illumination on the photodiodes, increasing the photocurrent of one photodiode and decreasing the photocurrent of the other, and vice versa. Subtraction of the photocurrents leads to a signal proportional to the output mode amplitude, and therefore to the rate. The resulting electrical signal is transmitted to and processed by the processing means, to determine the angular velocity. The processing means may include on-chip transimpedance low noise CMOS preamplifiers.

It should be noted that using the device of the present invention both dual axis acceleration and dual axis angular rate could be measured simultaneously.

In order to control damping and air resistance, the suspended proof mass and the CMOS chip are placed inside a controllable vacuum chamber. Mechanical and electrical integration is preferably obtained by employing indium bumps technology, or conductive epoxy bumping technology.

The proof mass displacement values may be in the order of angstroms. The sensitivity and threshold response of the device are determined by the spring constant of the resilient beams attached to the proof mass in the excitation mode as well as in the output mode, damping constants due to the surrounding and the beams themselves, sensitivity of the photodiodes at the illumination wavelength, the power of the light source, and various noise mechanisms in the mechanical and the electronical parts.

The evaluation of the photocurrent dependence on the modulation of the illumination on the photodiodes can be based on paraxial ray optics approximation. The use of ray optics approximation is limited by the diffraction pattern near the proof mass edges. In order to use this approximation, assuming small displacements of the proof mass, the width of the photodiodes in the direction of the motion should preferably be greater than $\sim 50(d\lambda/2)^{1/2}$, where d refers to the vertical distance between the edge of the vibrating proof mass from the photodiode, and $\lambda$ is the wavelength of the light source. Under this condition the change in the photocurrent due to the proof mass displacements is approximately linear. If the above relation is not observed then the concept remains but the change of the photocurrent due to the proof mass displacements becomes not linear, as it is affected by the diffraction pattern.

Another advantage of the optical sensing technique of the present invention is the possibility of illumination modulation. This feature enables the shifting of the frequency response of the system to higher frequencies, and this can be used in order to avoid the 1/f noise whenever it proves to be a limiting factor, and shift the response to the white noise domain. In general, the operating point of the vibrating rate gyroscope of the present invention is near the resonant frequency of the mechanical structure, in the order of several kHertz, and therefore 1/f noise is negligible. The device of the present invention does not, in principle suffer from cross-coupling, either electrical or mechanical, between the excitation mode and the output mode, as opposed to other known rate gyroscopes, due to the difference in the nature of the optical sensing and the electrostatic excitation mechanisms. The noises that affect the minimum detectable signal (MDS) include electronics noise, thermal-mechanical noise and photodiode noise, the latter assumed to be the dominant noise mechanism in the device of the present invention. In order to maximize the device performance, the noise equivalence rate (NER) should be reduced to a minimum, and the natural frequencies of the excitation mode and the output mode should be very close.

It should be clear that the above description of the embodiments of the present invention and the Figures disclosed are given for illustrative purposes only and in no way limit the scope of the invention as defined in the appending Claims.

It should also be clear that a person in the art, after reading the present specification could make adjustments or amendments to the attached Figures and above described embodiments that would still be covered by the following Claims.

What is claimed is:

1. The micro electromechanical optical inertial sensing device of the present invention comprises
    a CMOS chip comprising at least one integrated photodiode and analog electronics;
    an elastically suspended proof mass, hybridically attached to said CMOS chip, over the chip,
    a specified light source, directing a light beam at the suspended proof mass, on the side facing away from the CMOS chip, thus casting a partial shadow over said photodiode, when the suspended proof mass is at rest;
    signal processing circuit for the on chip processing of the photodiode output signal; and
    mechanical and electrical connecting means, to join the proof mass component with the CMOS chip component;
    wherein said photodiode is positioned substantially along the imaginary coaxis of the assumed measured movement and said proof mass, said photodiode being electrically connected to the processing means, wherein when the device is subjected to an inertial movement, the suspended proof mass swings, thus causing the partial shadow casted on the photodiode to shift, and modulate the light beam illumination on the CMOS integrated photodiode, generating subsequent output current signal transmitted to and processed by analog electronics processing means, to produce meaningful measurement results, or to generate electronic signals to other systems.

2. The device according to claim 1, wherein more than one photodiode is used.

3. The device according to claim 2, wherein two photodiodes are used.

4. The device according to claim 1, wherein said proof mass is fabricated by bulk micromachining of silicon wafer.

5. The device according to claim 1, wherein said proof mass is suspended by resilient beams.

6. The device according to claim 1, wherein said proof mass is attached to a solid frame.

7. The device according to claim 1, wherein said suspended proof mass is subjected to excited vibration.

8. The device according to claim 5, wherein said excited vibration is perpendicular to the CMOS chip plane.

9. The device according to claim 5, wherein capacitor plates are provided on the CMOS chip component and on the proof mass component, to enable electrostatic excited vibration.

10. The device according to claim 7, wherein said plates are evaporated metal plates, actung as an air capacitor.

11. The device according to claim 7, wherein said excitation is magnetic excitation.

12. The device according to claim 7, wherein said excitation is thermal excitation.

13. The device according to claim 7, wherein said excitation is piezoelectric excitation.

14. The device according to claims 2 or 3, wherein subtraction of the photocurrents produced by the photodiodes gives a signal proportional to the output mode amplitude.

15. The device according to claim 1, wherein said suspended proof mass and CMOS chip are placed inside a controlable vacuum chamber.

16. The device according to claim 1, wherein mechanical and electrical integration is obtained by employing indium bumps technology.

17. The device according to claim 1, wherein mechanical and electrical integration is obtained by conductive epoxy bumping technology.

18. The device according to claim 1, wherein said photodiode width is greater than $\sim 50(d\lambda/2)^{1/2}$, where d refers to the vertical distance between the edge of the vibrating proof mass and the photodiode, and $\lambda$ is the wavelength of the light source.

19. The device according to claim 1, wherein analog electronics is integrated on the same chip with the photodiodes.

20. The device according to claim 14, wherein said integrated analog electronics includes CMOS low noise amplifiers and circuitry.

* * * * *